US009095124B2

(12) United States Patent
Stewart

(10) Patent No.: US 9,095,124 B2
(45) Date of Patent: Aug. 4, 2015

(54) BOLUS BAG

(71) Applicant: Lynda Faye Stewart, Hong Kong (CN)

(72) Inventor: Lynda Faye Stewart, Hong Kong (CN)

( * ) Notice: Subject to any disclaimer, the term of this patent is extended or adjusted under 35 U.S.C. 154(b) by 0 days.

(21) Appl. No.: 14/467,247

(22) Filed: Aug. 25, 2014

(65) Prior Publication Data

US 2015/0053149 A1 Feb. 26, 2015

(30) Foreign Application Priority Data

Aug. 23, 2013 (GB) .................................. 1315149.3

(51) Int. Cl.
*A01K 23/00* (2006.01)

(52) U.S. Cl.
CPC ..................................... *A01K 23/00* (2013.01)

(58) Field of Classification Search
CPC ..... A01K 23/00; A01K 27/008; A01K 21/00; A01K 23/005; E01H 1/1206
USPC ............................ 119/868, 867, 869; 294/1.3
See application file for complete search history.

(56) References Cited

U.S. PATENT DOCUMENTS 4,444,152 A * 4/1984 Berardo ........................ 119/868
4,779,573 A * 10/1988 Vidal ............................ 119/868
4,969,419 A * 11/1990 Fong ............................ 119/868
5,355,836 A * 10/1994 Vallery ......................... 119/868
5,813,369 A * 9/1998 Fujinaga ....................... 119/868
5,819,691 A * 10/1998 Lavi et al. ..................... 119/868
5,934,226 A * 8/1999 Moore et al. .................. 119/868
5,937,795 A * 8/1999 Raphael ........................ 119/869
6,237,533 B1 * 5/2001 Rodriguez ..................... 119/161
6,394,041 B1 * 5/2002 Katz ............................. 119/868
6,439,627 B1 * 8/2002 Devane .......................... 294/1.3
D480,842 S * 10/2003 Grodecki ..................... D30/145
6,941,897 B1 * 9/2005 Rosales ......................... 119/868
7,506,615 B1 * 3/2009 Sansone et al. ............... 119/867
7,574,980 B2 * 8/2009 Bosio Blanco et al. ........ 119/868
7,607,407 B1 * 10/2009 Blanch .......................... 119/868
8,015,949 B2 * 9/2011 Dolub ........................... 119/868
8,205,580 B2 * 6/2012 Morman ....................... 119/868
8,302,565 B2 * 11/2012 Williams ...................... 119/868
8,746,183 B2 * 6/2014 Kosanke ....................... 119/868

FOREIGN PATENT DOCUMENTS

| | | |
|---|---|---|
| EP | 2070409 | 6/2009 |
| FR | 2649585 | 1/1991 |
| GB | 1315149.3 | 8/2013 |
| JP | 2001157526 | 6/2001 |
| JP | 2002142595 | 5/2002 |

* cited by examiner

*Primary Examiner* — Yvonne Abbott-Lewis
(74) *Attorney, Agent, or Firm* — Price Heneveld LLP

(57) ABSTRACT

A canine bolus bag including sheet material; a back sheet having a rear body and first and second projections extending upwardly from the body; the first and second projections connected to the body in spaced relation to define an aperture between the projections; a front sheet having a forward body portion, secured to the rear body at an edge thereof to form an upwardly opening pouch; the front sheet further includes a third projection extending from an upper edge of the pouch, the third projection being arranged to hang downwardly from the outside of the pouch in use; wherein the first and second projections are configured to be located on opposite sides of a dog's tail and tied together to secure the pouch; wherein the third projection may be tied to the first or second projections to close the pouch after use.

20 Claims, 3 Drawing Sheets

7 6 2 3 5 4 11 9 13 15 10 14 12

11
13
9
10
15
14
12

12
10
11
15
13
9

BOLUS BAG

CROSS-REFERENCE TO RELATED APPLICATION

This application claims priority to United Kingdom Application No. 1315149.3 filed on Aug. 23, 2013, which is hereby incorporated by reference in its entirety.

FIELD OF THE DISCLOSURE

This disclosure relates to an excrement catching device, particularly but not exclusively for attachment to the rear end of a dog or other animal in order to collect excrement before it reaches the ground, facilitating collection and disposal.

BACKGROUND

U.S. Pat. No. 6,394,041 discloses an excrement catching device for a dog comprising a receptacle which may be secured by means of straps around a dog's stomach and tail. Such an arrangement is complex and requires engagement of a strap around the dog's stomach and between the upper thighs. Such a harness may be uncomfortable and cause irritation.

A bag in accordance with the present disclosure has the advantage that it may be conveniently used by a person with limited sight and that a supply of the bags may be provided as a roll from which a single individual bag may be detached for use.

SUMMARY

According to the present disclosure, a canine bolus bag is provided consisting of one or more sheets of foldable material; a back sheet comprising a rear body and first and second projections extending upwardly from the body; the first and second projections connected to the body in spaced relation to define an aperture between the projections; a front sheet comprising a forward body, secured to the rear body at an edge thereof to form an upwardly opening pouch; the front sheet further comprising a third projection extending from an upper edge of the pouch, the third projection being arranged to hang downwardly from the outside of the pouch in use so that the weight of the third projection pulls a central portion of the pouch outwardly away from the back sheet to hold the pouch open in use; wherein the first and second projections are configured to be located on opposite sides of a dog's tail and tied together to secure the pouch; wherein the three projections have lengths selected so that the third projection may be tied to the first or second projections to close the pouch after use.

According to the present disclosure, a canine bolus bag comprises one or more sheets of foldable material comprising: a back sheet comprising a rear body and first and second projections extending upwardly from the body; the first and second projections integral with and extending upwardly from the back sheet in spaced relation to define an aperture between the projections; a front sheet comprising a forward body, secured to the rear body at one or more edges thereof to form an upwardly opening pouch which hangs downwardly from the first and second projections in use; the front sheet and a third projection extending from an upper edge of the pouch, the third projection being arranged to hang downwardly from the upper edge adjacent the outside of the pouch in use so that the weight of the third projection pulls a central portion of the front sheet outwardly away from the back sheet to hold the bag open in use to form an upwardly opening pouch; wherein the first and second projections are configured to be located on opposite sides of a dog's tail and tied together to secure the pouch; wherein the three projections have lengths selected so that the third projection may be tied to one or both of the first or second projections to close the pouch after use.

The bag is preferably formed from one or more sheets of foldable material. For example, polyethylene or other polymeric sheet material may be used. Alternatively, the bag may be composed wholly or partially of paper suitably coated to render the pouch waterproof. Use of paper or other biodegradable material is preferred.

The bag may include a conventional cylindrical or rectangular plastics or paper bag with the mouth portion cut away to form the first, second and third projections with apertures between the projections.

Preferably the bag consists entirely of the back and front sheets and projections with no fasteners or other non-sheet components being present.

Alternatively or in addition, one or more adhesive pads may be secured to the sheets as described below.

It is particularly advantageous for simplicity of manufacture, storage, transportation, dispensing and use that clips, straps or other ties are absent.

During the use of the bag, the front sheet is arranged facing towards a user as the user stands behind the dog to affix the bag to the dog's hind quarters. The back sheet faces away from the user to contact the dog's hind quarters so that both front and back sheets hang downwardly from a point of attachment when the projections are tied around the base of a dog's tail.

The bag may be formed from a single tubular or folded sheet or from two sheets, edges of the or each sheet is sealed together by thermal bonding or using an adhesive to form a tubular bag with a closed bottom and an upwardly facing opening to the pouch.

The front sheet may have a width greater than the back sheet so that the pouch naturally adopts an open position with a flat surface located against the dog's upper thighs and a curved open pouch facing rearwardly away from the dog's upper thighs. Alternatively, the back sheet may have a greater width than the front sheet so that the pouch naturally adopts an open position with the back sheet curved between the dog's upper thighs.

The third projection hangs downwardly from the exterior of the pouch, preferably from a central location thereof, in order to create a force to urge the pouch into an open position. The length and width of the third projection are preferably selected so that the weight thereof pulls the mouth of the pouch into an open configuration.

Preferably, the central location of the pouch opening is lower than the sides adjoining the back sheet This facilitates opening of the pouch in use.

One or more, preferably two, adhesive pads may be provided additional to the bag. These may be on the exterior of the bag sheet in order to allow for the bag to be secured to the rear of a dog's upper thighs. The adhesive pads securing the back sheet to the dog's upper thighs help maintain the pouch in a slightly open position. Preferably a non-setting adhesive is used so that the bag may be removed without causing discomfort. The adhesive pads may comprise portions of adhesive tape provided with peelable cover films. Alternatively, the first and second projections may be arranged to overlie and protect the adhesive pads until the bag is deployed when required for use.

Use of a bolus bag in accordance with the present disclosure confers several advantages. Fastening straps and clips or other harness arrangements are not required. A harness arrangement may be difficult to adjust and secure and may require regular cleaning. In addition, location of a harness adjacent a dog's stomach or rear upper thighs may impede the dog's movement and cause irritation. The entire bolus bag may have a unitary construction, be light in weight and flexible in use, creating a minimum of discomfort to a dog. The bag may be conveniently disposed of with minimal adverse environmental impact.

In preferred embodiments, the three projections may have lengths selected so that upper ends thereof are adjacent in order to facilitate tying together.

In preferred embodiments, the first and second projections form an aperture with a rounded lower edge dimensioned to receive a dog's tail.

According to a further aspect of the present disclosure there is provided a continuous sheet of bags in accordance with this disclosure joined consecutively by tearable perforated junctions, and a container having an opening through which the sheet may be withdrawn in use. The continuous sheet may be provided as a roil or as an alternating stack.

The container may comprise a cardboard box or, carton or a box, or carton formed from other suitable packaging material, wherein a mouth through which the sheet is dispensed includes a cutting edge which may be used to detach a single bag from the continuous sheet.

BRIEF DESCRIPTION OF THE DRAWINGS

The foregoing summary, as well as the following detailed description of the disclosure, will be better understood when read in conjunction with the appended drawings. For the purpose of illustrating the disclosure, there are shown in the drawings, certain embodiment(s) which are presently preferred. It should be understood, however, that the disclosure is not limited to the precise arrangements and instrumentalities shown. Drawings are not necessary to scale. Certain features of the disclosure may be exaggerated in scale or shown in schematic form in the interest of clarity and conciseness.

The disclosure is further described by means of example, but not in any limitative sense, with reference to the accompanying drawings, of which.

A bolus bag in accordance with this disclosure is shown in FIGS. 1-6.

DETAILED DESCRIPTION

Before the subject disclosure is described further, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an" and "the" include plural reference unless the context clearly dictates otherwise.

Figures 1, 2, 3:
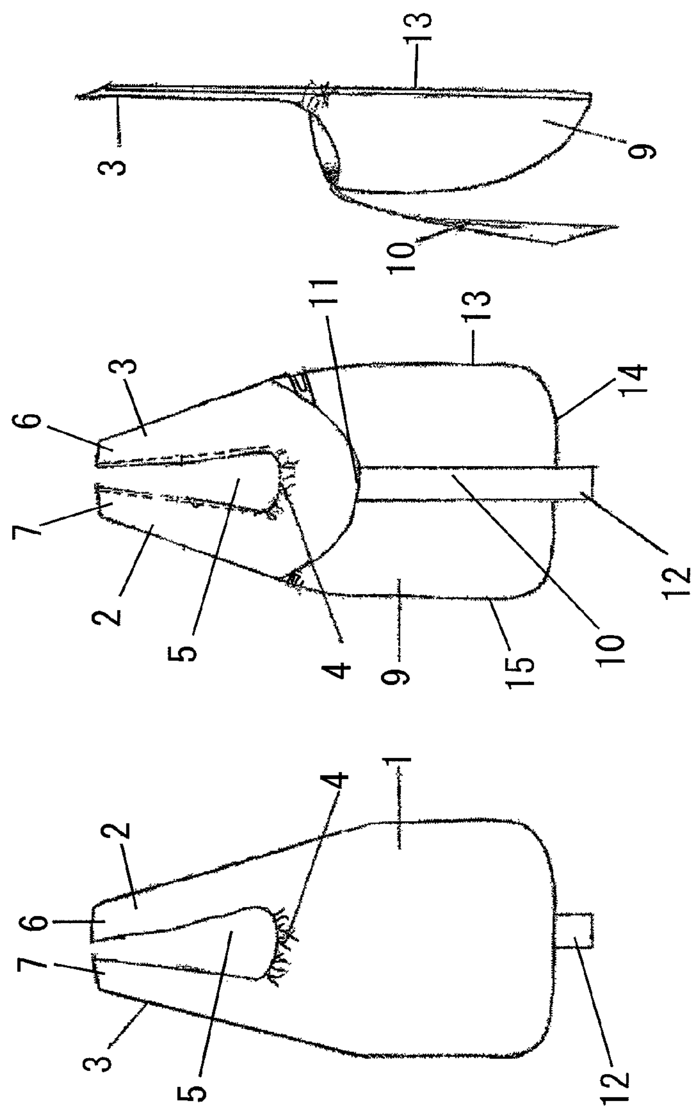
FIG. 1 is a rear view of a bolus bag in accordance with the disclosure.
FIG. 2 is a front view of the bag.
FIG. 3 is a side view of the bag.

FIG. 1 shows a rear view of the bag. A back sheet (1) has a generally rectangular configuration and first (2) and second (3) projections extending upwardly from sides of the back portion (1) to define an aperture (5) between the sides and a lower edge (4) of the aperture (5) having a curved configuration. The projections (2, 3) are inclined inwardly so that the top portions (6, 7) are located adjacent each other with a relatively narrow aperture (8) between them. The aperture (5) is dimensioned to be comfortably received around the base of a dog's tail (not shown) with the ends (6, 7) of the projections (2, 3) being tied together to secure the bag.

Figures 4, 5:
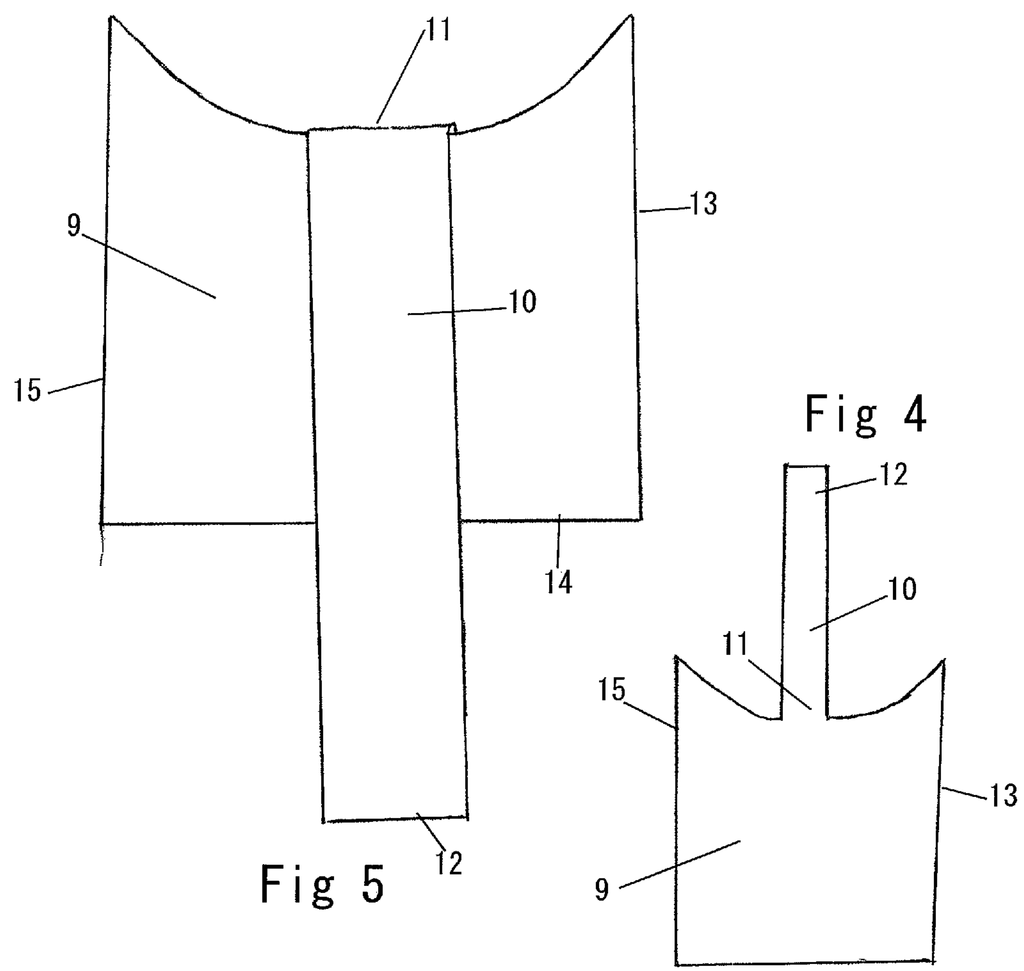
FIG. 4 shows a front sheet of the bag.
FIG. 5 shows a front sheet of the bag with the projection folded downwardly.
Figure 6:
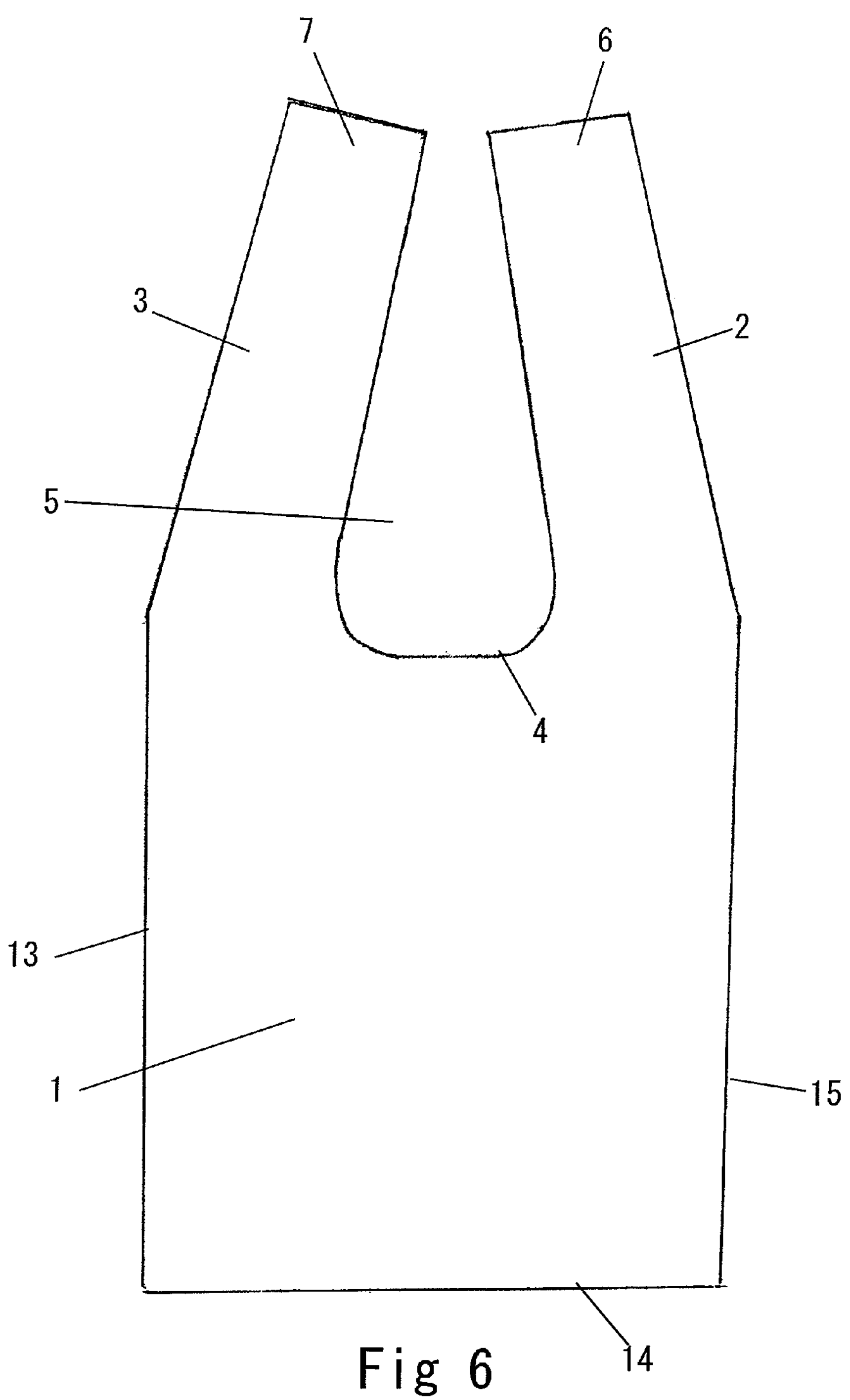
FIG. 6 shows the back sheet of the bag.

A front view of the bag shown in FIG. 2 shows a front sheet (9) secured at edges (13, 14, 15) to the back sheet (1) to form an upwardly opening pouch. A strip shaped rectangular projection (10) integral with the front sheet (9) extends upwardly from the upper edge of the front sheet as shown in FIG. 4. In preferred embodiments, the projection (10) is formed integrally from the same material as front sheet (9). FIGS. 3 and 5 show the rectangular projection (10) hanging downwardly on the exterior of the front sheet (9) so that the weight of the projection (10) pulls the central portion (11) of the pouch outwardly away from the back sheet (1) so as to hold the pouch open in use. The central portion (11) is preferably lower than the side portions which adjoin the back sheet (1)

After use the ends (6, 7, 12) may be tied together in order to close the pouch for disposal.

The disclosure claimed is:

1. A canine bolus bag consisting of one or more sheets of foldable material;

a back sheet comprising a rear body and first and second projections extending upwardly from the body;

the first and second projections connected to the body in spaced relation to define an aperture between the projections;

a front sheet comprising a forward body, secured to the rear body at an edge thereof to form an upwardly opening pouch;

the front sheet further comprising a third projection extending from an upper edge of the pouch, the third projection being arranged to hang downwardly from the outside of the pouch in use so that the weight of the third projection pulls a central portion of the pouch outwardly away from the back sheet to hold the pouch open in use;

wherein the first and second projections are configured to be located on opposite sides of a dog's tail and tied together to secure the pouch;

wherein the three projections have lengths selected so that the third projection may be tied to the first or second projections to close the pouch after use.

2. The canine bolus bag of claim 1 formed from one or more sheets of foldable material.

3. The canine bolus bag of claim 2, wherein the one or more sheets of foldable material comprise polymeric or paper sheet material.

4. The canine bolus bag of claim 3, wherein the front sheet has a greater width than the back sheet.

5. The canine bolus bag of claim 4, wherein the third projection hangs downwardly from a central location of the exterior of the pouch.

6. The canine bolus bag of claim 4, wherein the third projection comprises folded material.

7. The canine bolus bag of claim 2, wherein the front sheet has a greater width than the back sheet.

8. The canine bolus bag of claim 7, wherein the third projection hangs downwardly from a central location of the exterior of the pouch.

9. The canine bolus bag of claim 1, wherein the front sheet has a greater width than the back sheet.

10. The canine bolus bag of claim 9, wherein the third projection hangs downwardly from a central location of the exterior of the pouch.

11. The canine bolus bag of claim 1, wherein the third projection hangs downwardly from a central location of the exterior of the pouch.

12. The canine bolus bag of claim 11, wherein the central location is lower than side locations adjoining the back sheet.

13. The canine bolus bag of claim 11, wherein the third projection comprises folded material.

14. The canine bolus bag of claim 11 further comprising one or more adhesive pads on an exterior of the front sheet.

15. The canine bolus bag of claim 1, wherein the third projection comprises folded material.

16. The canine bolus bag of claim 15, wherein the third projection comprises folded material.

17. The canine bolus bag of claim 15 further comprising one or more adhesive pads on an exterior of the front sheet.

18. The canine bolus bag of claim 1 further comprising one or more adhesive pads on an exterior of the front sheet.

19. A continuous sheet of a plurality of canine bolus bags of claim 1, joined consecutively, end to end, by tearable perforated junctions and a container having an opening through which the sheet may be withdrawn in use.

20. A continuous sheet of a plurality of canine bolus bags of claim 1, joined consecutively, end to end, by tearable perforated junctions and a container having an opening through which the sheet may be withdrawn in use and wherein the canine bolus bag is formed from one or more sheets of foldable material, the front sheet has a greater width than the back sheet, the third projection hangs downwardly from a central location of the exterior of the pouch, the third projection comprises folded material, and wherein the canine bolus bag further comprises one or more adhesive pads on an exterior of the front sheet.

* * * * *